(12) United States Patent
Cho et al.

(10) Patent No.: US 10,927,737 B2
(45) Date of Patent: Feb. 23, 2021

(54) METHOD AND SYSTEM FOR PURIFYING EXHAUST GAS FOR PREVENTION OF $NH_3$ SLIP

(71) Applicants: HYUNDAI MOTOR COMPANY, Seoul (KR); KIA MOTORS CORPORATION, Seoul (KR)

(72) Inventors: Hyo-Sang Cho, Suwon-si (KR); Kyoung-Min Lee, Hwaseong-si (KR); Jun-Yong Lee, Seongnam-si (KR); Kyoung-Chan Han, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/658,348

(22) Filed: Oct. 21, 2019

(65) Prior Publication Data
US 2020/0182119 A1 Jun. 11, 2020

(30) Foreign Application Priority Data

Dec. 6, 2018 (KR) .......................... 10-2018-0156339

(51) Int. Cl.
*F01N 3/035* (2006.01)
*F01N 3/20* (2006.01)
*F01N 9/00* (2006.01)
*F01N 11/00* (2006.01)
*B01D 53/94* (2006.01)

(52) U.S. Cl.
CPC ........... *F01N 3/2046* (2013.01); *F01N 3/035* (2013.01); *F01N 3/208* (2013.01); *F01N 3/2066* (2013.01); *F01N 9/00* (2013.01); *F01N 11/00* (2013.01); *B01D 53/9418* (2013.01); *F01N 2610/02* (2013.01); *F01N 2900/1404* (2013.01); *F01N 2900/1631* (2013.01)

(58) Field of Classification Search
CPC ...... F01N 3/035; F01N 3/0842; F01N 3/2066; F01N 3/208; F01N 9/00; F01N 11/00; F01N 2610/02; F01N 2900/1404; F01N 2900/1631
See application file for complete search history.

(56) References Cited

U.S. PATENT DOCUMENTS

2016/0281574 A1* 9/2016 Abel ....................... F01N 9/005
2018/0274417 A1* 9/2018 Mao ...................... F01N 3/2066
2018/0291783 A1* 10/2018 Smith ................... F01N 3/0814

FOREIGN PATENT DOCUMENTS

KR 10-1684502 12/2016

* cited by examiner

*Primary Examiner* — Audrey K Bradley
(74) *Attorney, Agent, or Firm* — Brinks Gilson & Lione

(57) ABSTRACT

A system for purifying exhaust gas includes a controller to predict a possibility of ammonia ($NH_3$) slip occurring at the rear end of a selective catalytic reduction on a diesel particulate filter (SDPF) by comparing a convective heat transfer value (h) with a first predetermined value. The controller determines whether an engine is rapidly accelerated, and performs a control to prevent introduction of ammonia downstream of the SDPF when the ammonia slip is predicted to occur.

13 Claims, 5 Drawing Sheets

METHOD AND SYSTEM FOR PURIFYING EXHAUST GAS FOR PREVENTION OF NH$_3$ SLIP

CROSS-REFERENCE TO RELATED APPLICATION

This application claims priority to and the benefit of Korean Patent Application No. 10-2018-0156339, filed on Dec. 6, 2018, the entire contents of which are incorporated herein by reference.

FIELD

Exemplary forms of the present disclosure relate to a method and system for purifying exhaust gas.

BACKGROUND

The statements in this section merely provide background information related to the present disclosure and may not constitute prior art.

In general, the exhaust gas discharged from an engine through an exhaust manifold is guided to and purified by a catalytic converter installed in an exhaust pipe, passes through a muffler to attenuate its noise, and is then discharged to the atmosphere through a tail pipe. The catalytic converter purifies pollutants contained in exhaust gas. A particulate filter is mounted on the exhaust pipe to collect particulate matters (PM) contained in exhaust gas.

In recent years, a selective catalytic reduction (SCR) catalyst on a diesel particulate filter (hereinafter, referred to as "SDPF") has been used to remove nitrogen oxide (NOx) contained in exhaust gas. The SDPF is a filter in which a selective catalytic reduction catalyst is coated on the porous partition wall of a particulate matter removal filter. The particulate matters contained in exhaust gas are collected in the porous partition wall of the SDPF and the catalyst coated on the porous partition wall reduces the nitrogen oxide contained in exhaust gas using the reducing agent injected toward the exhaust gas from an injector installed at the front end of the filter.

When urea as a reducing agent is injected into exhaust gas, it is converted into ammonia (NH$_3$) through pyrolysis by the heat of exhaust gas or hydrolysis by a catalyst, and the converted ammonia is converted into nitrogen and water molecules by reaction with nitrogen oxide and discharged to the outside. A surplus of ammonia that is not reacted with the nitrogen oxide is occluded in the SDPF. The ammonia occlusion capacity of the SDPF is largely affected by the temperature of the SDPF. Accordingly, when the temperature of the SDPF increases as exhaust gas is rapidly heated as in case of sudden acceleration of the vehicle, the occlusion capacity of the SDPF is rapidly decreased so that the ammonia occluded in the catalyst is released, which is called an ammonia slip phenomenon. As illustrated in FIG. 4, when the temperature of exhaust gas increases due to sudden acceleration of the engine or the like, the current actual ammonia occlusion amount is increased compared to the target ammonia occlusion amount in the SDPF such that the amount of ammonia slipped is increased.

We have found that when ammonia slip occurs, the ammonia removed from the rear end of the SDPF is dissolved in the condensate generated in a low-pressure exhaust gas recirculation (hereinafter, referred to as "LP-EGR") device, a compressor inlet of a turbocharger, an intercooler, or the like, thereby forming an aqueous ammonia solution having basicity. When such an aqueous ammonia solution comes into contact with an alloy made of aluminum and other metals, galvanic corrosion may occur. FIG. 5 is a photograph illustrating an inner surface of an LP-EGR cooler. It can be seen that the inner surface of the cooler is significantly corroded to the ammonia removed by ammonia slip.

We have also discovered that when the ammonia slip occurs at the rear end of the SDPF and the exhaust gas containing the ammonia removed thereafter is introduced into the LP-EGR cooler or the like, various engine parts may be corroded and the engine may thus be fatally damaged. Therefore, it is desired to perform control to predict an occurrence of ammonia slip at the rear end of the SDPF so as to prevent or inhibit the ammonia slip in advance or block introduction of removed ammonia into the LP-EGR cooler or the like. However, it is not easy to predict the ammonia slip before a predetermined time in advance when the driving state of the engine is rapidly changed and the temperature of the SDPF is rapidly increased as in case of sudden acceleration of the engine.

SUMMARY

The present disclosure is directed to a method and system for purifying exhaust gas, capable of predicting an occurrence of ammonia slip at a rear end of an SDPF to prevent it in advance.

Other objects and advantages of the present disclosure can be understood by the following description, and become apparent with reference to the forms of the present disclosure. Also, it is obvious to those skilled in the art to which the present disclosure pertains that the objects and advantages of the present disclosure can be realized by the means as claimed and combinations thereof.

In one form of the present disclosure, a method of purifying exhaust gas includes: predicting ammonia (NH$_3$) slip in advance at a rear end of a selective catalytic reduction catalyst on a diesel particulate filter (SDPF) by determining whether an engine is rapidly accelerated, and performing control to prevent introduction of ammonia downstream of the SDPF when the ammonia slip is predicted to occur.

In order to predict the ammonia slip in advance, when a convective heat transfer value (h), determined by the following Equation 1, transferred to the SDPF exceeds a first predetermined value, it is determined that a condition that the ammonia slip occurs under rapid acceleration of the engine is satisfied:

$$h = (M_{air} + M_{fuel}) * V * \frac{T_3 - \Delta T_{TC} - T_{SDPF}}{100000000} \quad (1)$$

where h: a convective heat transfer value, $M_{air}$: an amount of air for each cylinder (mg), $M_{fuel}$: an amount of fuel for each cylinder (mg), v: an engine speed (rpm), $T_3$: an inlet-side exhaust gas temperature (° C.) of a turbine of a turbocharger, $\Delta T_{TC}$: a variation in temperature of exhaust gas when passing through the turbine of the turbocharger, and $T_{SDPF}$: a temperature (° C.) of the SDPF.

In order to more accurately predict the ammonia slip, the method may further include comparing the temperature ($T_{SDPF}$) of the SDPF with a second predetermined value, wherein when the temperature ($T_{SDPF}$) of the SDPF is less than the second predetermined value in the case where the convective heat transfer value exceeds the first predetermined value, it may be determined that the condition that the ammonia slip occurs under rapid acceleration of the engine is satisfied.

In order to more accurately predict the ammonia slip, the method may further include comparing a variation per unit time of the inlet-side exhaust gas temperature ($T_3$) of the turbine of the turbocharger with a third predetermined value, wherein when the variation per unit time of the inlet-side exhaust gas temperature ($T_3$) of the turbine of the turbocharger exceeds the third predetermined value in the case where the convective heat transfer value exceeds the first predetermined value and the temperature ($T_{SDPF}$) of the SDPF is less than the second predetermined value, it may be determined that the condition that the ammonia slip occurs under rapid acceleration of the engine is satisfied.

In performing the control to prevent introduction of ammonia downstream of the SDPF, an operation of a low-pressure exhaust gas recirculation (LP-EGR) device may be restricted, thereby preventing introduction of the slipped ammonia downstream of the SDPF.

In performing the control to prevent introduction of ammonia downstream of the SDPF, a target occlusion amount of ammonia in the SDPF may be restricted, thereby suppressing the occurrence of the ammonia slip.

The method may further include determining whether an operable condition of selective catalytic reduction (SCR) is satisfied before the predicting ammonia ($NH_3$) slip.

In another form of the present disclosure, a system for purifying exhaust gas includes: an engine for producing power by burning fuel and discharging exhaust gas generated in a combustion process through an exhaust pipe, an injector for injecting a reducing agent into the exhaust gas discharged through the exhaust pipe, a selective catalytic reduction catalyst on a diesel particulate filter (SDPF) disposed downstream of the injector to reduce nitrogen oxide contained in the exhaust gas using the reducing agent injected by the injector, a low-pressure exhaust gas recirculation (LP-EGR) device for recirculating some of the exhaust gas discharged from the engine to the engine, and a control unit for predicting a probability of ammonia slip occurring at a rear end of the SDPF and controlling at least one of the LP-EGR device and the injector according to the prediction result, wherein when a convective heat transfer value (h), determined by the following Equation 1, transferred to the SDPF exceeds a first predetermined value, the control unit determines that a condition that the ammonia slip occurs under rapid acceleration of the engine is satisfied:

$$h = (M_{air} + M_{fuel}) * V * \frac{T_3 - \Delta T_{TC} - T_{SDPF}}{100000000} \quad (1)$$

where h: a convective heat transfer value, $M_{air}$: an amount of air for each cylinder (mg), $M_{fuel}$: an amount of fuel for each cylinder (mg), v: an engine speed (rpm), $T_3$: an inlet-side exhaust gas temperature (° C.) of a turbine of a turbocharger, $\Delta T_{TC}$: a variation in temperature of exhaust gas when passing through the turbine of the turbocharger, and $T_{SDPF}$: a temperature (° C.) of the SDPF.

In order to more accurately predict whether the ammonia slip occurs, when the temperature ($T_{SDPF}$) of the SDPF is less than a second predetermined value in the case where the convective heat transfer value (h) exceeds the first predetermined value, the control unit may determine that the condition that the ammonia slip occurs under rapid acceleration of the engine is satisfied.

In order to more accurately predict whether the ammonia slip occurs, when a variation per unit time of the inlet-side exhaust gas temperature ($T_3$) of the turbine of the turbocharger exceeds a third predetermined value in the case where the convective heat transfer value exceeds the first predetermined value and the temperature ($T_{SDPF}$) of the SDPF is less than the second predetermined value, the control unit may determine that the condition that the ammonia slip occurs under rapid acceleration of the engine is satisfied.

In order to increase purification efficiency of exhaust gas, a lean NOx trap (LNT) for occluding the nitrogen oxide contained in the exhaust gas may be provided upstream of the SDPF.

In order to increase purification efficiency of exhaust gas, the system may further include an additional selective catalytic reduction (SCR) provided downstream of the SDPF to reduce the nitrogen oxide contained in the exhaust gas using the reducing agent injected by the injector.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4 is a graph illustrating an exhaust temperature over time, a concentration of ammonia slipped at a rear end of an SDPF, an amount of ammonia occluded in the SDPF or the like, a supply amount of reducing agent, a concentration of nitrogen oxide at a front of the SDPF, and so on.

The drawings described herein are for illustration purposes only and are not intended to limit the scope of the present disclosure in any way.

DETAILED DESCRIPTION

The drawings described herein are for illustration purposes only and are not intended to limit the scope of the present disclosure in any way.

Figure 1:
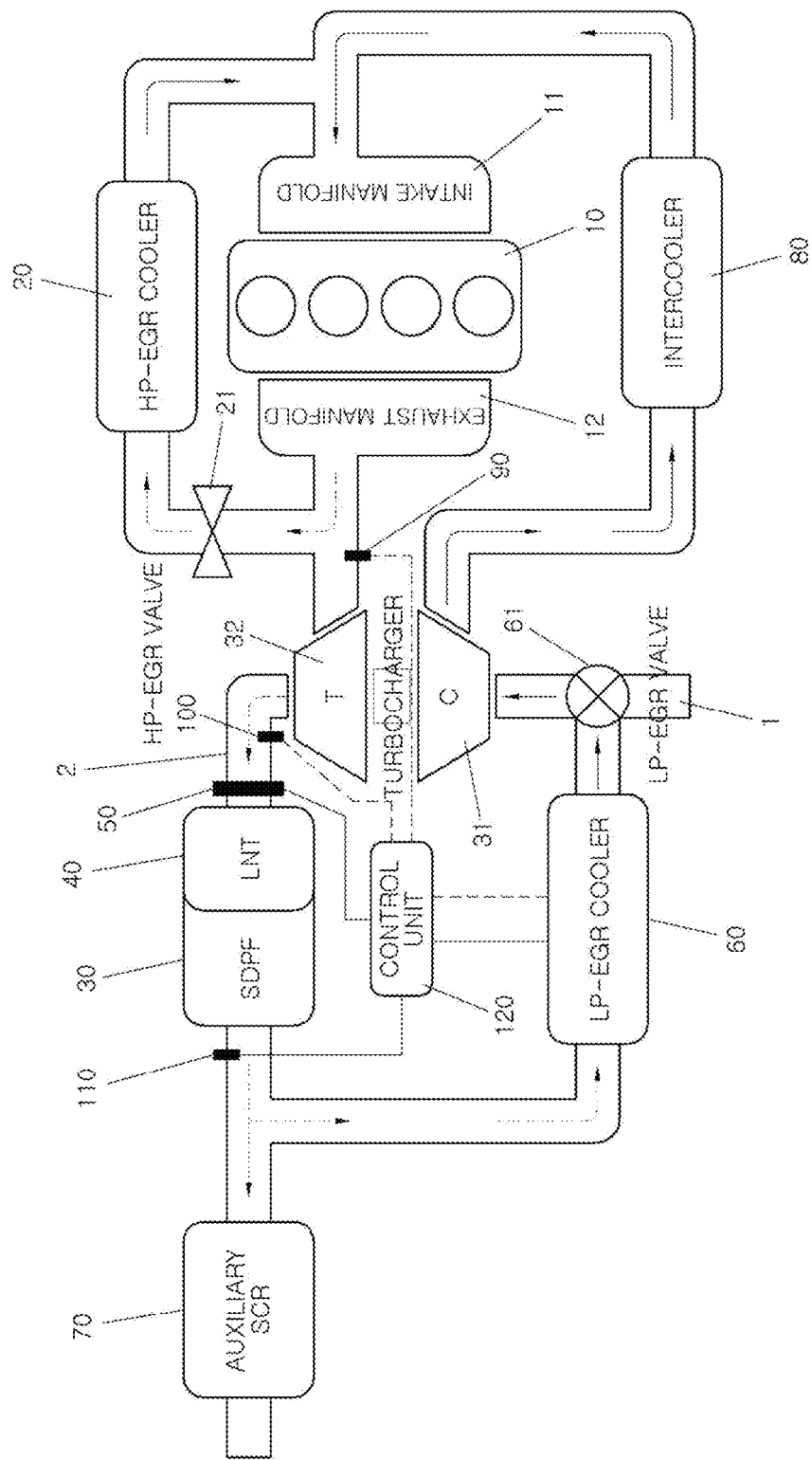
FIG. 1 is a diagram illustrating an engine system including an exhaust gas purification system according to the present disclosure.

The present disclosure may be embodied in different forms and should not be construed as limited to the forms set forth herein. Rather, these forms are provided so that this disclosure will be thorough and complete, and will fully convey the scope of the present disclosure to those skilled in the art. First, an example of an engine system to which the present disclosure is applicable will be described. FIG. 1 is a diagram illustrating an engine system including an exhaust gas purification system according to one form of the present disclosure.

As illustrated in FIG. 1, the engine system including the exhaust gas purification system may include an engine 10 that produces power by burning a mixture of air and fuel, a turbocharger that compresses outside air and supplies it to cylinders to increase the output of the engine 10, and a high-pressure exhaust gas recirculation device that recirculates exhaust gas to an intake system of the engine 10. The turbocharger includes a turbine 32 and a compressor 31, and the turbine 32 and the compressor 31 are integrally rotated.

In the engine system illustrated in FIG. 1, the outside air sucked through an intake port 1 is compressed by the compressor 31 of the turbocharger, and the air that has passed through the compressor 31 is supplied to an intercooler 80 and then supplied to each cylinder of the engine 10 through an intake manifold 11 of the engine 10.

The air supplied to the intake manifold 111 is mixed with the fuel injected by a fuel injection means such as an injector (not shown), thereby forming a mixture. The mixture is burned in the engine 10 to produce power. The high-pressure exhaust gas generated in the process of burning the mixture in the engine 10 is discharged to an exhaust system through an exhaust manifold 12 to rotate the turbine 32 of the turbocharger. For reduction of exhaust gas, some of the high-pressure exhaust gas discharged from the exhaust manifold 12 is recirculated to the intake manifold 11 through a high-pressure exhaust gas recirculation (hereinafter, referred to as "HP-EGR") device. The flow rate of the recirculated HP-EGR gas is controlled by an HP-EGR valve 21 and the gas is cooled by an HP EGR cooler 20 before it is recirculated to the engine 10.

An injector 50 is provided on an exhaust pipe 2 through which exhaust gas is discharged for injecting a reducing agent into the exhaust gas discharged through the exhaust pipe under the control of a control unit 120. Usually, urea is injected as the reducing agent, and the injected reducing agent is converted into ammonia ($NH_3$) by pyrolysis by the heat of exhaust gas or hydrolysis by a catalyst.

An SDPF 30 is provided downstream of the injector 50. The SDPF has a porous partition wall therein, and the partition wall is coated with a selective catalytic reduction catalyst. The exhaust gas introduced from the inlet of the SDPF 30 is discharged through the outlet thereof through the porous partition wall therein. Particulate matters contained in exhaust gas are collected while the exhaust gas passes through the porous partition wall. By the selective catalytic reduction catalyst coated on the porous partition wall of the SDPF 30, the ammonia produced through the injector is converted into nitrogen and water molecules by reaction with the nitrogen oxide in the exhaust gas and then discharged. This enables the nitrogen oxide in the exhaust gas to be removed. The amount of the reducing agent supplied by the injector 50 may be determined according to a concentration of nitrogen oxide on the upstream side of the SDPF 30, a current occlusion amount of ammonia with respect to the target occlusion amount of ammonia in the SDPF 30, and the like. The concentration of nitrogen oxide and the current occlusion amount of ammonia in the SDPF 30 may be measured and calculated by NOx sensors (not shown) provided at the front and rear ends of the SDPF 30.

In one form, a lean NOx trap (LNT) 40 may be installed upstream of the SDPF 30. The LNT 40 is a device that reduces nitrogen oxide and the nitrogen oxide contained in exhaust gas by adsorbing the nitrogen oxide contained in the exhaust gas when it is operated in an atmosphere in which the air-fuel ratio of the engine is lean and removing the adsorbed nitrogen oxide when it is operated in an atmosphere in which the air-fuel ratio of the engine is rich. Since the LNT 40 is provided upstream of the SDPF 30, it is possible to more effectively remove the nitrogen oxide contained in the exhaust gas.

Some of the low-pressure exhaust gas that has passed through the SDPF 30 is recirculated to the inlet of the compressor 31 of the turbocharger by LP-EGR. The amount of the recirculated low-pressure exhaust gas is controlled by adjusting the degree of opening of the HP-EGR valve 21 by the control unit 120 and is cooled by the HP-EGR cooler 20 before it is recirculated to the engine 10.

Figure 4:
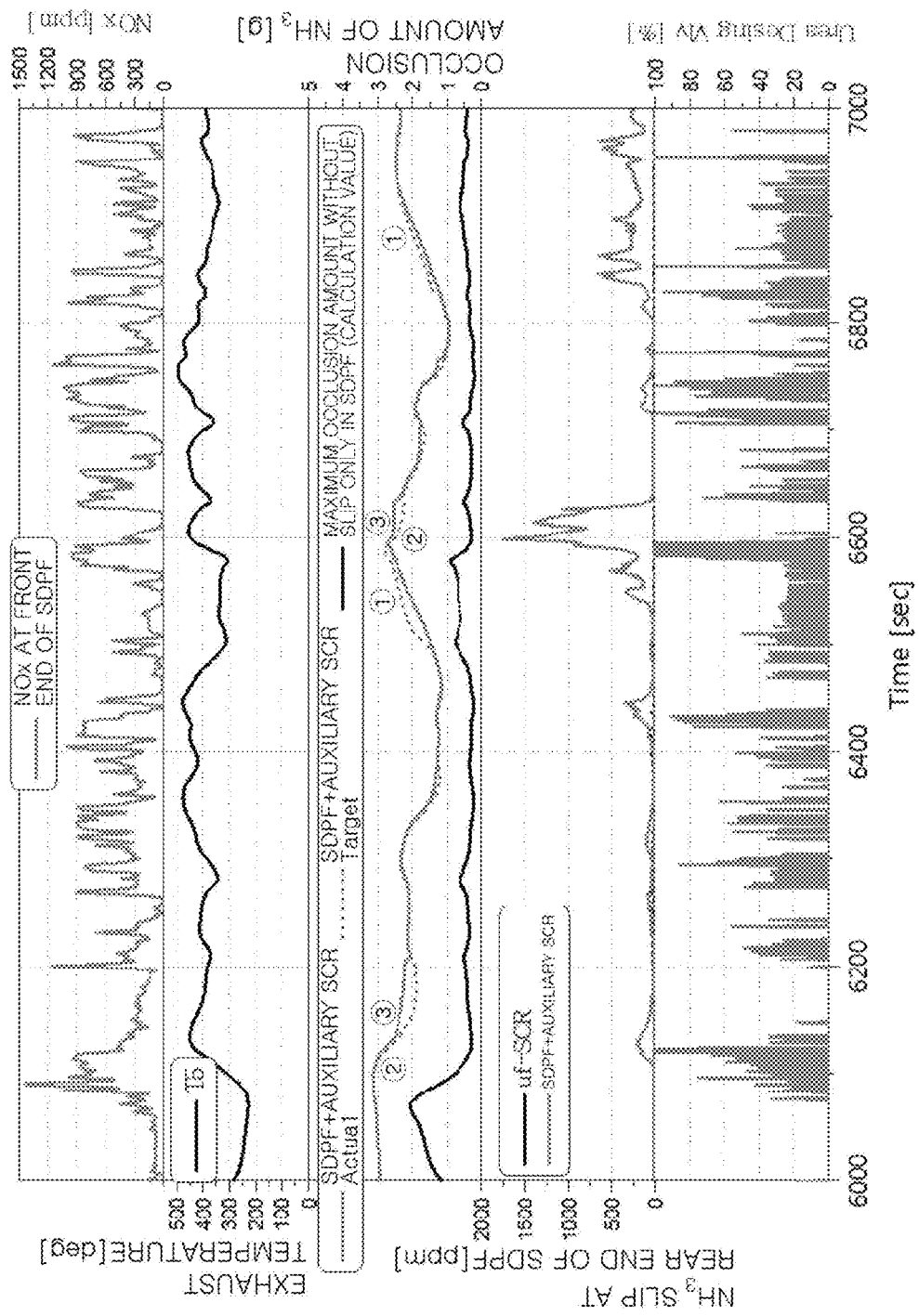
Figure 5:
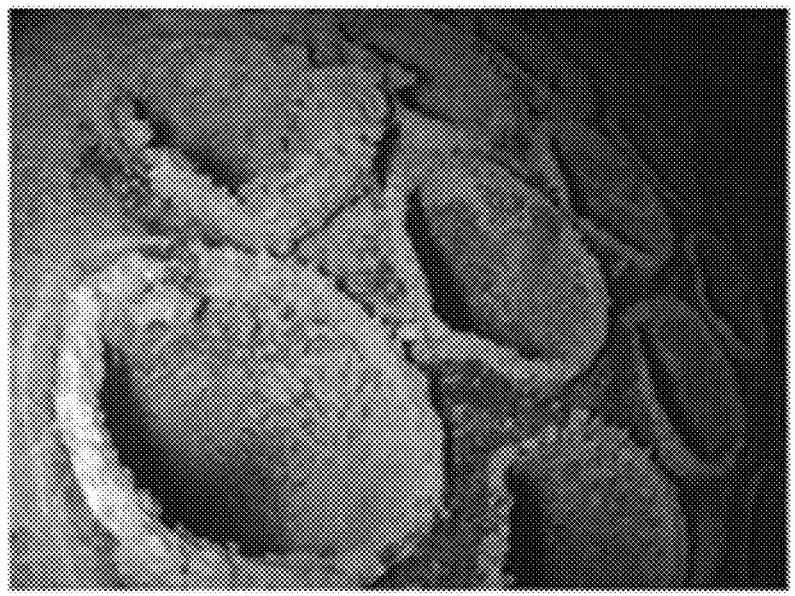
FIG. 5 is a photograph illustrating a corrosion phenomenon occurring on an inner surface of an LP-EGR cooler.

In another form, an auxiliary SCR 70, which is an additional selective catalytic reduction catalyst capable of removing the nitrogen oxide in exhaust gas, may be installed downstream of the SDPF 30. The auxiliary SCR 70 additionally reduces the nitrogen oxide that is not completely removed from the SDPF 30 by the catalyst. As illustrated in FIG. 4, under the condition that the temperature of exhaust gas is high, the maximum occlusion amount of ammonia in the SDPF 30 is very low. Accordingly, it is possible to effectively reduce the amount of the nitrogen oxide and ammonia discharged to the outside by adopting the auxiliary SCR 70.

Temperature sensors 90, 100, 110 are respectively provided at the inlet of the turbine 32 of the turbocharger (at the rear end of the exhaust manifold 12), the outlet of the turbine 32 of the turbocharger, and the rear end of the SDPF 30 and are used to predict ammonia slip as described later by measuring the temperature of exhaust gas at corresponding positions.

As described above, the control unit 120 is a unit that controls at least the degree of opening of the LP-EGR valve 61 and the amount of the reducing agent injected from the injector 50. Particularly, the control unit 120 of the present disclosure predicts whether the ammonia slip occurs at the rear end of the SDPF 30. When the ammonia slip is predicted to occur, the control unit 120 appropriately controls the degree of opening of the LP-EGR valve 61 and the amount of the reducing agent injected from the injector 50, thereby preventing the occurrence of ammonia slip or preventing the introduction of the slipped ammonia into the LP-EGR cooler 60 or the like.

In one form, the control unit 120 calculates a convective heat transfer value (h) related to the amount of heat transferred to the SDPF 30 and compares it with a first predetermined value ($\alpha$) as a reference value to predict whether the ammonia slip occurs.

The convective heat transfer value (h) may be derived through the following procedure.

First, the amount of thermal energy transferred from an open system is generally calculated according to the law of conservation of energy by the following Equation 1.

$$\frac{dE}{dt} = \dot{Q}_{in} - \dot{W}_{out} + \sum_{in} \dot{m}\left(u + \frac{V^2}{2} + \frac{P}{\rho}\right) - \sum_{out} \dot{m}\left(u + \frac{V^2}{2} + \frac{P}{\rho}\right) \quad (1)$$

Meanwhile, when Equation 1 is applied to the SDPF 30 and the thermal energy transferred to the outside is neglected, there is no work transferred to the outside and the flow rate, speed, and pressure at the inlet are same as those at the outlet by the law of conservation of mass and the law of conservation of momentum. Therefore, the above Equation 1 may be simplified as in the following Equation 2.

$$\frac{dE}{dt} = \dot{q} \dot{z} + \sum_{in} \dot{m}(u + v_i^2, \tfrac{p}{2}) - \sum_{out} \dot{m}(u + v_i^2, \tfrac{p}{2}) \quad (2)$$

Since the variation of energy of the SDPF 30 is represented as the variation of internal energy, the above Equation 2 may be expressed by the following Equation 3. In Equation 3, the right side refers to the product of the exhaust flow rate passing through the SDPF 30 and the difference between the inlet temperature ($T_{out}$) and outlet temperature ($T_{out}$) of the SDPF 30.

$$\frac{d(C_v M T_{SDPF})}{dt} = C_v \dot{m}(T_{in} - T_{out}) \quad (3)$$

Assuming that the heat exchange of exhaust gas is sufficient in Equation 3, it may be assumed that the temperature of exhaust gas at the outlet of the SDPF 30 is substantially equal to the temperature ($T_{SDPF}$) of the SDPF 30. Therefore, the above Equation 3 may be expressed by the following Equation 4.

$$\frac{d(C_v M T_{SDPF})}{dt} = C_v \dot{m}(T_{in} - T_{SDPF}) \quad (4)$$

In Equation 4, it can be seen that the increase in the rapid temperature of the SDPF 30 is caused when the exhaust flow rate is large and the exhaust gas temperature ($T_{in}$) at the inlet of the SDPF 30 is higher than the temperature ($T_{SDPF}$) of the SDPF 30.

Here, since the exhaust flow rate on the right side of Equation 3 is proportional to the combination of an intake air amount per cylinder ($M_{air}$), a fuel injection amount per cylinder ($M_{fuel}$), and an engine speed (rpm), it may be expressed by the following Equation 5.

$$C_v \dot{m} = (M_{air} + M_{fuel}) * \text{rpm} \quad (5)$$

The front end of the SDPF 30 is at the position where the smallest thermal inertia delay occurs. Accordingly, it may be expressed by the following Equation 6 in consideration of the heat loss ($\Delta T_{TC}$) to the inlet of the SDPF 30 from the position, which is a position where the increase in temperature of exhaust gas is first detectable, of the temperature sensor 90 for measuring the inlet-side temperature ($T_3$) of the turbine 32 of the turbocharger.

$$(T_{in} - T_{SDPF}) = T_3 - \Delta T_{TC} - T_{SDPF} \quad (6)$$

When the above Equations 5 and 6 are applied to Equation 4, the convective heat transfer amount (h), which is the thermal energy transferred to the SDPF 30, may be defined by the following Equation 7.

$$h = (M_{air} + M_{fuel}) * V * \frac{T_3 - \Delta T_{TC} - T_{SDPF}}{100000000} \quad (7)$$

In Equation 7, $M_{air}$ is an amount of air for each cylinder (mg), $M_{fuel}$ is an amount of fuel for each cylinder (mg), v is an engine speed (rpm), $T_3$ is an inlet-side exhaust gas temperature (° C.) of the turbine 31 of the turbocharger, $\times T_{TC}$ is a variation in temperature of exhaust gas when passing through the turbine 31 of the turbocharger, and $T_{SDPF}$ is a temperature (° C.) of the SDPF.

Figure 3:
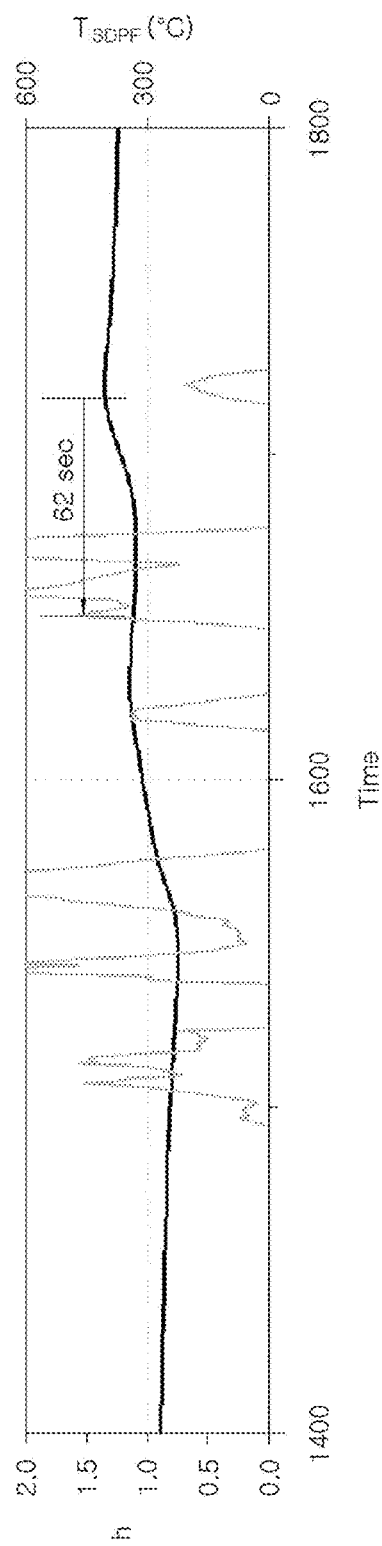
FIG. 3 is a graph illustrating a prediction about an occurrence of ammonia slip (an increase of a convective heat transfer value) before the ammonia slip occurs (an SDPF reaches a predetermined temperature) using the exhaust gas purification method according to the present disclosure.

As illustrated in FIG. 3, it can be seen that the temperature ($T_{SDPF}$) of the SDPF 30 increases and the convective heat transfer amount (h) rapidly increases before 62 seconds of when the ammonia slip occurs. That is, a convective heat transfer value (h) is calculated and the calculated value is compared with a first predetermined value ($\alpha$), in which case when the convective heat transfer value (h) exceeds the first predetermined value ($\alpha$), it may be predicted that the ammonia slip will occur after a certain time. As illustrated in FIG. 3, the first predetermined value ($\alpha$) may be set to about 1.5. The control unit 120 predicts whether the ammonia slip occurs through the calculation and determination process.

Meanwhile, when the temperature of the SDPF 30 is equal to or higher than a predetermined temperature, the amount of ammonia currently occluded in the SDPF 30 is extremely low. Therefore, even when the convective heat transfer value (h) exceeds the first predetermined value ($\alpha$), it may be determined that the possibility of ammonia slip is not high. Accordingly, the control unit 120 compares the temperature ($T_{SDPF}$) of the SDPF 30 with a second predetermined value ($\beta$), in which case it may be determined that the condition that the ammonia slip is predicted under rapid acceleration of the engine is satisfied only when the temperature ($T_{SDPF}$) is less than the second predetermined value. In one form, the second predetermined value ($\beta$) ranges from 350° C. to 400° C.

In the case where the above two conditions are satisfied, the variation per unit time (for example, per second) of the inlet-side temperature ($T_3$) of the turbine 31 of the turbocharger is used to more reliably predict the occurrence of ammonia slip. When the inlet-side exhaust gas temperature ($T_3$) of the turbine 31 of the turbocharger is rapidly changed, it may be determined that the engine 10 is rapidly accelerated. Accordingly, in the case where the above two conditions are satisfied, the control unit 120 compares the variation per unit time of the inlet-side temperature ($T_3$) of the turbine 31 of the turbocharger with a third predetermined value ($\gamma$), in which case when the variation per unit time of the inlet-side temperature ($T_3$) of the turbine 31 of the turbocharger exceeds the third predetermined value ($\gamma$), it is determined that the condition that the ammonia slip is predicted under rapid acceleration of the engine is satisfied. The third predetermined value ($\gamma$) may be set to an appropriate value according to the output of the engine 10 and the driving state of the engine 10.

When the ammonia slip is predicted to occur, the control unit 120 performs control to prevent the introduction of ammonia into the LP-EGR cooler 60, the intercooler 80, or the like through the LP-EGR device positioned downstream of the SDPF 30. Specifically, the LP-EGR valve 61 is controlled to restrict the operation of the LP-EGR device by reducing the degree of opening of the LP-EGR valve 61 or closing the LP-EGR passage. Thereby, it is possible to prevent the transfer of ammonia to other engine parts such as the intercooler 80 through the LP-EGR passage even though the removed ammonia is generated due to the occurrence of ammonia slip at the rear end of the SDPF 30.

In one form, when the ammonia slip is predicted to occur, the control unit 120 performs control to restrict the target occlusion amount of ammonia in the SDPF 30. As described above, the control unit 120 controls the amount of the reducing agent injected through the injector 50 based on the difference between the target occlusion amount of ammonia and the current occlusion amount of ammonia in the SDPF 30. When the target occlusion amount is lowered, the amount of the reducing agent injected through the injector 50 is reduced. Therefore, it is possible to reduce the amount of ammonia generated by hydrolysis of the reducing agent in the exhaust gas. Thus, since the amount of ammonia occluded in the SDPF 30 is reduced, it is possible to prevent the occurrence of ammonia slip in advance.

Figure 2:
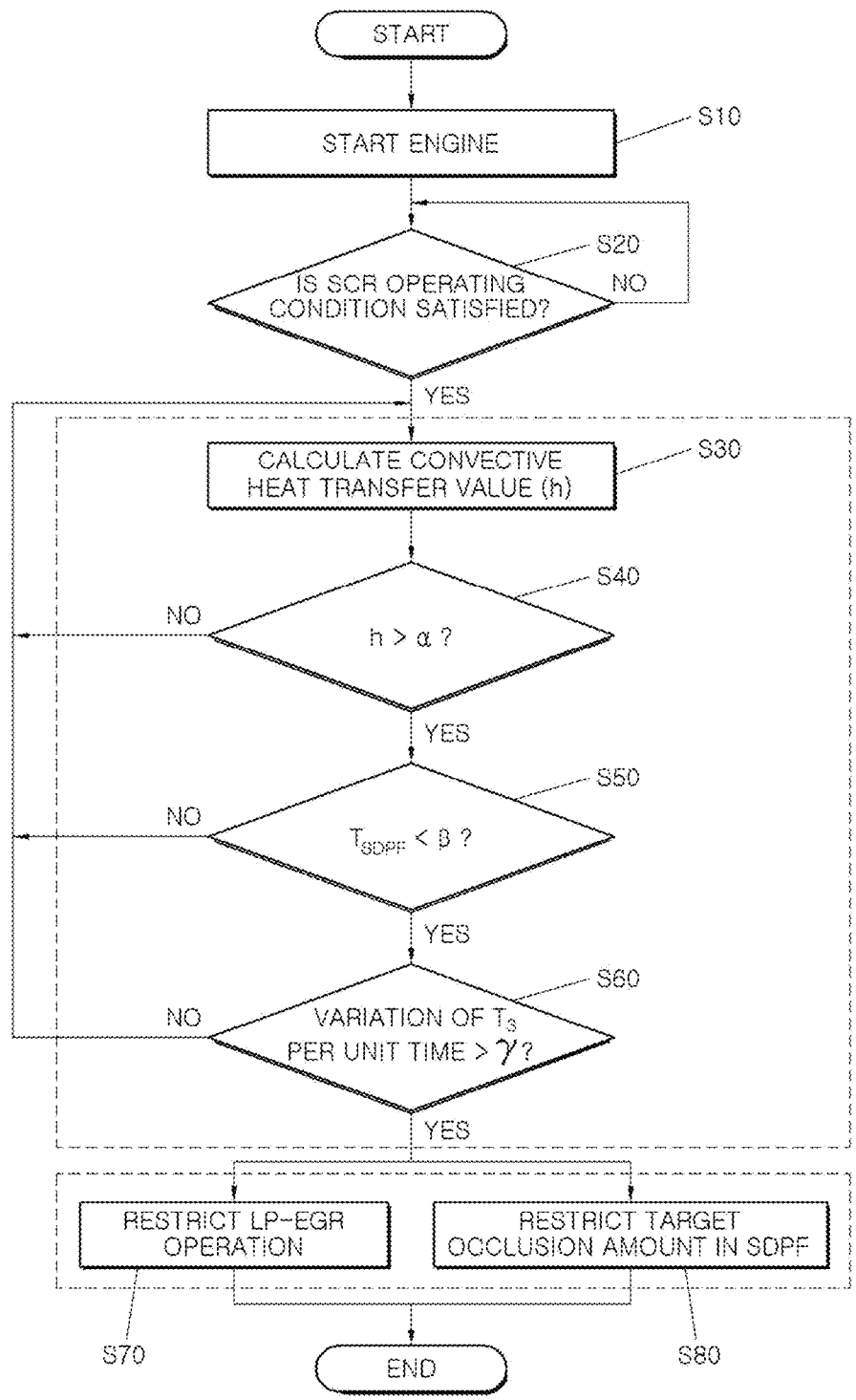
FIG. 2 is a flowchart illustrating an exhaust gas purification method according to the present disclosure.

FIG. 2 is a flowchart illustrating an exhaust gas purification method using the exhaust gas purification system illustrated in FIG. 1 according to another form of the present disclosure.

As illustrated in FIG. 2, when the engine 10 starts (S10), the control unit 120 first determines whether the SCR operating condition is satisfied. That is, it is determined whether nitrogen oxide is removable using the SCR based on the driving state of the vehicle engine or the like. Particularly, it is desired to set the temperature of exhaust gas to a predetermined temperature or more when the nitrogen oxide contained in the exhaust gas is reduced by injection the reducing agent into the exhaust gas. Accordingly, it is determined whether the SCR operating condition is satisfied in consideration of the temperature of exhaust gas, the flow rate of exhaust gas, or the like at the SCR inlet.

When it is determined that the SCR operating condition is satisfied, the control unit 120 performs steps of predicting an occurrence of ammonia slip (S30 to S60).

First, the control unit 120 calculates a convective heat transfer value (h) which is the amount of heat transferred to the SDPF 30 using the above-mentioned Equation 7 (S30). The inlet-side exhaust gas temperature ($T_3$) of the turbine 32 of the turbocharger in Equation 7 uses a value measured by the temperature sensor 90 provided downstream of the exhaust manifold 12. The variation in temperature of exhaust gas (° C.) when passing through the turbine of the turbocharger is calculated using the measured value of the temperature sensor 90 and a value measure by the temperature sensor 100 provided downstream of the turbine 32 of the turbocharger. The temperature of the SDPF 30 may be set to a filter temperature directly measured by the temperature sensor or a value measured by the temperature sensor 110 installed downstream of the SDPF 30. The amount of air for each cylinder ($M_{air}$), the amount of fuel for each cylinder ($M_{fuel}$), and the engine speed (v) may be obtained by values measured from a flow rate sensor such as HFM and an engine RPM sensor, the conventional fuel amount calculation method, and so on.

The control unit 120 compares the calculated convective heat transfer value (h) with a first predetermined value ($\alpha$) (S30). When the calculated convective heat transfer value (h) exceeds the first predetermined value ($\alpha$), it may be determined that the possibility of ammonia slip occurring within a predetermined time is high.

Moreover, when the calculated convective heat transfer value (h) exceeds the first predetermined value ($\alpha$), the control unit 120 may compare the temperature ($T_{SDPF}$) of the SDPF 30 with a second predetermined value ($\beta$) to more reliably predict the occurrence of ammonia slip (S50). When the temperature ($T_{SDPF}$) of the SDPF 30 is less than the second predetermined value ($\beta$), the control unit 120 may determine that the possibility of ammonia slip occurring within a predetermined time is higher.

Furthermore, when the calculated convective heat transfer value (h) exceeds the first predetermined value ($\alpha$) and the temperature ($T_{SDPF}$) of the SDPF 30 is less than the second predetermined value ($\beta$), the control unit 120 may compare the variation per unit time of the inlet-side exhaust gas temperature ($T_3$) of the turbine 32 of the turbocharger with a third predetermined value ($\gamma$) to more reliably predict the occurrence of ammonia slip (S60). When it is determined that the variation per unit time of the inlet-side exhaust gas temperature ($T_3$) of the turbine 32 of the turbocharger exceeds the third predetermined value ($\gamma$), the control unit 120 predicts that the ammonia slip will occur within a predetermined time.

When the ammonia slip is predicted to occur within the predetermined time, the control unit 120 controls the degree of opening of the LP-EGR valve 61 or the injection amount of the injector 50 to suppress the occurrence of ammonia slip or prevent the removed ammonia from flowing downstream of the SDPF 30, thereby preventing the introduction of the ammonia downstream of the SDPF 30.

Specifically, the control unit 120 performs control to restrict the operation of the LP-EGR device in step S70. That is, the control unit 120 transmits a control duty for closing the LP-EGR valve 61 or decreasing the degree of opening thereof to the LP-EGR valve 61 to prevent the removed ammonia from flowing into the engine parts, such as the LP-EGR cooler 60 or the intercooler 80, disposed downstream of the SDPF 30 even when the ammonia slip actually occurs.

In addition, the control unit 120 performs control to restrict the target occlusion amount in the SDPF 30 in step S80. As described above, the control unit 120 controls the amount of the reducing agent injected through the injector 50 based on the difference between the target occlusion amount of ammonia and the current occlusion amount of ammonia in the SDPF 30. Accordingly, when the target occlusion amount is lowered, the amount of the reducing agent injected through the injector 50 is reduced. Therefore, it is possible to reduce the amount of ammonia generated by hydrolysis of the reducing agent in the exhaust gas. Thus, since the amount of ammonia occluded in the SDPF 30 is reduced, it is possible to prevent the occurrence of ammonia slip in advance. Therefore, it is possible to prevent the introduction of ammonia downstream of the SDPF 30.

In the exemplary forms of the present disclosure, it is possible to accurately predict that ammonia slip will occur at the rear end of the SDPF, before a predetermined time, through only information on the exhaust gas temperature at the front and rear ends of the turbocharger, the temperature of the SDPF, the amount of air, and the amount of fuel. Therefore, it is possible to secure a sufficient time for performing control to prevent the occurrence of ammonia slip in advance or to prevent introduction of the removed ammonia into the LP-EGR cooler or the like.

Accordingly, the present disclosure can have an effect of preventing or reducing the occurrence of the ammonia slip or preventing introduction of the removed ammonia into the LP-EGR cooler or the like, thereby inhibiting the damage of the engine by preventing the corrosion of parts related thereto or the like.

While the present disclosure has been described with respect to the specific forms, it will be apparent to those skilled in the art that various changes and modifications may be made without departing from the spirit and scope of the present disclosure.

What is claimed is:

1. A method of purifying exhaust gas for prevention of $NH_3$ slip, the method comprising:
predicting ammonia ($NH_3$) slip in advance at a rear end of a selective catalytic reduction catalyst on a diesel particulate filter (SDPF) by determining whether an engine is rapidly accelerated; and performing control to prevent introduction of ammonia downstream of the SDPF when the ammonia slip is predicted to occur, wherein in response to a convective heat transfer value (h) transferred to the SDPF exceeding a first predetermined value, it is determined that a condition that the ammonia slip occurs under rapid acceleration of the engine is satisfied.

2. The method of claim 1, wherein the convective heat transfer value (h) is determined by the following Equation:

$$h = (M_{air} + M_{fuel}) * V * \frac{T_3 - \Delta T_{TC} - T_{SDPF}}{100000000}$$

where h: a convective heat transfer value, $M_{air}$: an amount of air for each cylinder (mg), $M_{fuel}$: an amount of fuel for each cylinder (mg), v: an engine speed (rpm), $T_3$: an inlet-side exhaust gas temperature (° C.) of a turbine of a turbocharger, $\Delta T_{TC}$: a variation in temperature of exhaust gas when passing through the turbine of the turbocharger, and $T_{SDPF}$: a temperature (° C.) of the SDPF.

3. The method of claim 2, further comprising: comparing the temperature ($T_{SDPF}$) of the SDPF with a second predetermined value, wherein in response to the temperature ($T_{SDPF}$) of the SDPF being less than the second predetermined value in the case where the convective heat transfer value exceeds the first predetermined value, it is determined that the condition that the ammonia slip occurs under rapid acceleration of the engine is satisfied.

4. The method of claim 3, further comprising: comparing a variation per unit time of the inlet-side exhaust gas temperature ($T_3$) of the turbine of the turbocharger with a third predetermined value, wherein in response to the variation per unit time of the inlet-side exhaust gas temperature ($T_3$) of the turbine of the turbocharger exceeding the third predetermined value in the case where the convective heat transfer value exceeds the first predetermined value and the temperature ($T_{SDPF}$) of the SDPF is less than the second predetermined value, it is determined that the condition that the ammonia slip occurs under rapid acceleration of the engine is satisfied.

5. The method of claim 1, wherein in performing the control to prevent introduction of ammonia downstream of the SDPF, an operation of a low-pressure exhaust gas recirculation (LP-EGR) device is restricted.

6. The method of claim 1, wherein in performing the control to prevent introduction of ammonia downstream of the SDPF, a target occlusion amount of ammonia in the SDPF is restricted.

7. The method of claim 1, further comprising: determining whether an operable condition of selective catalytic reduction (SCR) is satisfied before predicting the ammonia ($NH_3$) slip.

8. A system for purifying exhaust gas, comprising:
an engine configured to produce power by burning fuel and discharge exhaust gas generated in a combustion process through an exhaust pipe;
an injector configured to inject a reducing agent into the exhaust gas discharged through the exhaust pipe;
a selective catalytic reduction catalyst on a diesel particulate filter (SDPF) disposed downstream of the injector and configured to reduce nitrogen oxide contained in the exhaust gas using the reducing agent injected by the injector;
a low-pressure exhaust gas recirculation (LP-EGR) device configured to recirculate some of the exhaust gas discharged from the engine to the engine; and
a control unit configured to predict a probability of ammonia slip occurring at a rear end of the SDPF and to control at least one of the LP-EGR device or the injector based on the predicted possibility of ammonia slip, wherein when a convective heat transfer value (h) transferred to the SDPF exceeds a first predetermined value, the control unit determines that a condition that the ammonia slip occurs under rapid acceleration of the engine is satisfied.

9. The system of claim 8, wherein the convective heat transfer value (h) is determined by the following Equation:

$$h = (M_{air} + M_{fuel}) * V * \frac{T_3 - \Delta T_{TC} - T_{SDPF}}{100000000}$$

where h: a convective heat transfer value, $M_{air}$: an amount of air for each cylinder (mg), $M_{fuel}$: an amount of fuel for each cylinder (mg), v: an engine speed (rpm), $T_3$: an inlet-side exhaust gas temperature (° C.) of a turbine of a turbocharger, $\Delta T_{TC}$: a variation in temperature of exhaust gas when passing through the turbine of the turbocharger, and $T_{SDPF}$: a temperature (° C.) of the SDPF.

10. The system of claim 9, wherein when the temperature ($T_{SDPF}$) of the SDPF is less than a second predetermined value in the case where the convective heat transfer value (h) exceeds the first predetermined value, the control unit determines that the condition that the ammonia slip occurs under rapid acceleration of the engine is satisfied.

11. The system of claim 10, wherein when a variation per unit time of the inlet-side exhaust gas temperature ($T_3$) of the turbine of the turbocharger exceeds a third predetermined value in the case where the convective heat transfer value exceeds the first predetermined value and the temperature ($T_{SDPF}$) of the SDPF is less than the second predetermined value, the control unit determines that the condition that the ammonia slip occurs under rapid acceleration of the engine is satisfied.

12. The system of claim 8, wherein a lean NOx trap (LNT) for occluding the nitrogen oxide contained in the exhaust gas is provided upstream of the SDPF.

13. The system of claim 8, further comprising: an additional selective catalytic reduction (SCR) provided downstream of the SDPF and configured to reduce the nitrogen oxide contained in the exhaust gas using the reducing agent injected by the injector.

* * * * *